United States Patent [19]

Lewis

[11] 3,865,868

[45] Feb. 11, 1975

[54] PRODUCTION OF UNSATURATED ESTERS

[75] Inventor: Jack Lewis, Cambridge, England

[73] Assignee: Imperial Chemical Industries Limited, London, England

[22] Filed: Feb. 26, 1973

[21] Appl. No.: 336,046

[30] Foreign Application Priority Data
Mar. 13, 1972  Great Britain.................... 11591/72

[52] U.S. Cl... 260/475 N, 260/410.9 N, 260/475 R, 260/476 R, 260/485 R, 260/485 N, 260/497 A
[51] Int. Cl... C07c 69/44, C07c 69/78, C07c 69/80
[58] Field of Search........ 260/475 N, 485 N, 476 R, 260/497 A, 410.9 N

[56] References Cited
FOREIGN PATENTS OR APPLICATIONS
1,224,595   3/1971   Great Britain................. 260/475 N

*Primary Examiner*—Lorraine A. Weinberger
*Assistant Examiner*—E. Jane Skelly
*Attorney, Agent, or Firm*—Cushman, Darby & Cushman

[57] ABSTRACT

Unsaturated esters are produced by reacting an acyclic conjugated diolefine such as butadiene with a carboxylic acid, particularly orthophthalic acid, in the presence of ethylene and a platinum or iridium compound. The esters produced are oligomers of butadiene, the ethylene giving enhanced catalyst stability and life.

8 Claims, No Drawings

PRODUCTION OF UNSATURATED ESTERS

The present invention relates to the production of unsaturated esters.

According to the invention a process for the production of unsaturated esters containing one or more groups,

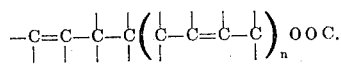

comprises reacting an acyclic conjugated diolefine of basic structure

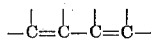

with a carboxylic acid in the presence of ethylene and a platinum or iridium compound, in which n is a whole number and the residual valencies in the formulae are satisfied by inorganic substituents such as halogen or by organic substituents or by hydrogen.

In the formula

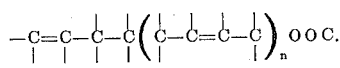

$n$ is preferably 1 or 2.

The residual valencies of the acyclic conjugated diolefine are preferably satisfied by alkyl groups, particularly lower ($C_1$ to $C_6$) alkyl groups such as methyl groups or by hydrogen. Thus butadiene, isoprene or piperylene may be used in the process, butadiene being particularly preferred.

The carboxylic acid may be an aliphatic or aromatic mono- or di-carboxylic acid. Examples of monocarboxylic acids are benzoic acid, toluic acid and alkanoic acids, particularly lower alkanoic acids containing up to 6 carbon atoms, such as acetic acid. Dibasic acids which may be used include dibasic alkanoic acids such as adipic acid and dibasic aromatic acids, particularly the three phthalic acids. With dibasic acids, one or both of the carboxylic groups may react with the acyclic conjugated diolefine, thereby giving rise to products containing one or two of the groups

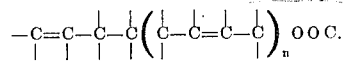

The unsaturated product of the process is derived from a dimer or lower polymer of the acyclic conjugated diolefine

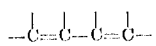

and from the carboxyl group. The di-esters, in which $n = 1$ derived from the dibasic acids, e.g., from ortho-phthalic acid, may after hydrogenation of the olefinically unsaturated bonds be used as plasticiser esters. Thus the di-ester derived from ortho-phthalic acid and butadiene yields, after hydrogenation, di-n-octyl-orthophthalate.

Compounds of platinum or iridium may be used in the process and of these platinum is preferred. Suitable compounds of platinum or iridium include the halides, e.g., the chloride such as platinic chloride, lower alkanoates of acids containing up to 6 carbon atoms, e.g., the acetate, organo-complexes of the metals such as the acetylacetonate and complexes with ligands such as the alkyl or aryl phosphines, particularly triphenyl phosphine, e.g., tetrakis(tri-phenyl phosphine) platinum. The concentration of the platinum or iridium compound in the reaction solution may be $10^{-7}$ to 1.0 molar, preferably $10^{-6}$ to 1.0 molar, more preferably $10^{-4}$ to $10^{-12}$ molar.

The reaction is carried out in the presence of ethylene, i.e., by passing ethylene into the reaction solution or by carrying out the reaction in a sealed system under an atmosphere comprising ethylene. The ethylene partial pressure may be up to 100 atmospheres, preferably up to 50 atmospheres and is more preferably in the range 5 to 30 atmospheres. We have found that the benefits conferred by the use of ethylene include improved catalyst stability and a reduction in the tendency of the product to isomerise to more highly branched chain isomers.

The process may be carried out in an inert solvent, e.g., an aromatic hydrocarbon such as benzene or toluene or a paraffin such as hexane or a cycloparaffin such as cyclohexane. Polar solvents such as acetone, dimethylformamide, dimethylacetamide or tetrahydrofuran may also be used. The temperature under which the process may be carried out preferably lies in the range ambient to 300°C, more preferably 50° to 150°C.

It is also advantageous, particularly when the process is carried out in a steel reaction vessel to include a copper salt in the reaction medium to minimise a tendency of the acyclic conjugated diolefine to form homopolymers. Preferably the copper salt is an alkanoate such as copper acetate and it is preferably present in a concentration in the range $10^{-4}$ to $10^{-2}$ molar.

The invention will now be further described with reference to the following Examples.

EXAMPLE 1

7.3 grams ortho-phthalic acid (0.044 mole), 12 grams butadiene (0.22 mole), 0.020 grams platinum acetylacetonate (0.05 millimole), 0.053 gram copper acetate (0.30 millimole) and 20 mls. benzene were heated in an autoclave under 20 atmospheres pressure of ethylene at a temperature of 150° C for three hours. At the end of the reaction unchanged phthalic acid (3.0 gram) was filtered off and the solvent evaporated to yield di-octa-2,7-dienyl-ortho-phthalate (4.4 grams), and mono-octa-2,7-dienyl-orthophthalate (3.6 grams).

EXAMPLE 2

6.0 grams acetic acid (0.10 mole), 12 grams butadiene (0.22 mole), 0.020 grams platinum acetylacetonate (0.05 millimole), 0.051 grams copper acetate (0.30 millimole) and 20 mls. benzene were heated in an autoclave under 20 atmospheres ethylene at a temperature of 150°C for 3 hours. At the end of the reaction the mixture was distilled at 110°C/23 mm. to yield 2.8 grams of octa-2,7-dienyl acetate.

I claim:

1. A process for the production of unsaturated esters containing one or more groups

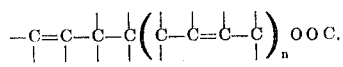

in which $n$ is 1 which comprises reacting an acyclic conjugated diolefine selected from the group consisting of butadiene, isoprene and piperylene with a carboxylic acid selected from the group consisting of aliphatic and aromatic mono- and di-carboxylic acids in the presence of ethylene and a platinum or iridium compound, said compound being a halide, a lower alkanoate of an acid containing up to 6 carbon atoms or an organocomplex, the amount of said compound in the reaction solution being from $10^{-7}$ to 1.0 molar.

2. The process of claim 1 in which the carboxylic acid is benzoic acid, a toluic acid, a lower alkanoic acid containing up to 6 carbon atoms, adipic acid or one of the three phthalic acids.

3. The process of claim 1 in which the partial pressure of the ethylene is up to 100 atmospheres.

4. The process of claim 1 in which an inert solvent is present.

5. The process of claim 4 in which the inert solvent is an aromatic hydrocarbon, a paraffin, a cycloparaffin or a polar solvent.

6. The process of claim 1 in which the reaction is carried out in a steel reaction vessel and a copper salt is present.

7. The process of claim 1 in which an octadienyl ester is produced by reaction butadiene with adipic acid, orthophthalic acid or acetic acid at 50° to 300°C in the presence of a $10^{-7}$ to 1.0 molar concentration of a platinum halide, a platinum acetylacetonate or a platinum alkanoate of an acid containing up to 6 carbon atoms and in the presence of up to 100 atmospheres partial pressure of ethylene.

8. The process of claim 1 in which the diolefine is butadiene.

* * * * *